No. 655,440. Patented Aug. 7, 1900.
F. G. HOBART.
CLUTCH MECHANISM.
(Application filed Oct. 13, 1898.)
(No Model.)

Witnesses
Wm. M. Rheem.
H. S. Barrett.

Inventor
Frank G. Hobart
by Paul Synnestvedt Atty.

UNITED STATES PATENT OFFICE.

FRANK G. HOBART, OF BELOIT, WISCONSIN, ASSIGNOR TO THE FAIRBANKS, MORSE & COMPANY, OF CHICAGO, ILLINOIS.

CLUTCH MECHANISM.

SPECIFICATION forming part of Letters Patent No. 655,440, dated August 7, 1900.

Application filed October 13, 1898. Serial No. 893,434. (No model.)

*To all whom it may concern:*

Be it known that I, FRANK G. HOBART, a citizen of the United States, residing in Beloit, Rock county, Wisconsin, have invented certain new and useful Improvements in Clutch Mechanism, of which the following is a specification.

My invention relates particularly to that class of devices which are designed to be used in connecting and disconnecting a moving or driving part with an idler part or piece to be driven and is of the class commonly known as "friction-clutches."

My invention has for its object, primarily, the construction of a device of the type mentioned which will be compact and economical in construction, reliable and efficient in its operation, and arranged to be readily thrown into and out of operation by hand.

More specifically, my invention has for one object the provision of a friction-clutch comprising a driving-shaft, a loose gear or pulley mounted thereon, a sliding friction-sleeve mounted upon the shaft in position to be thrown into and out of engagement with the loose gear, a system of bell-crank levers pivotally attached at their angles to the sleeve, a collar or block adjustably fixed relatively as to the shaft and forming a fulcrum for one arm of each of the levers, and means (preferably a hand-wheel or nut working on a threaded extension of the driving-shaft) connected to the other arm of each of the levers for moving the sliding friction-sleeve.

A further object of my invention is to provide a novel arrangement of parts in combination with improved devices whereby great accuracy and security of adjustment are secured and whereby compensation may be had for wear of the friction-surfaces.

A further object of my invention is the provision of a friction-clutch having a hand operating device which will be not only easy to manipulate, but also safe to the operator.

The above, as well as such other objects as may hereinafter appear, I attain by means of a construction which I have illustrated in preferred form in the accompanying drawings, in which—

Figure 1:
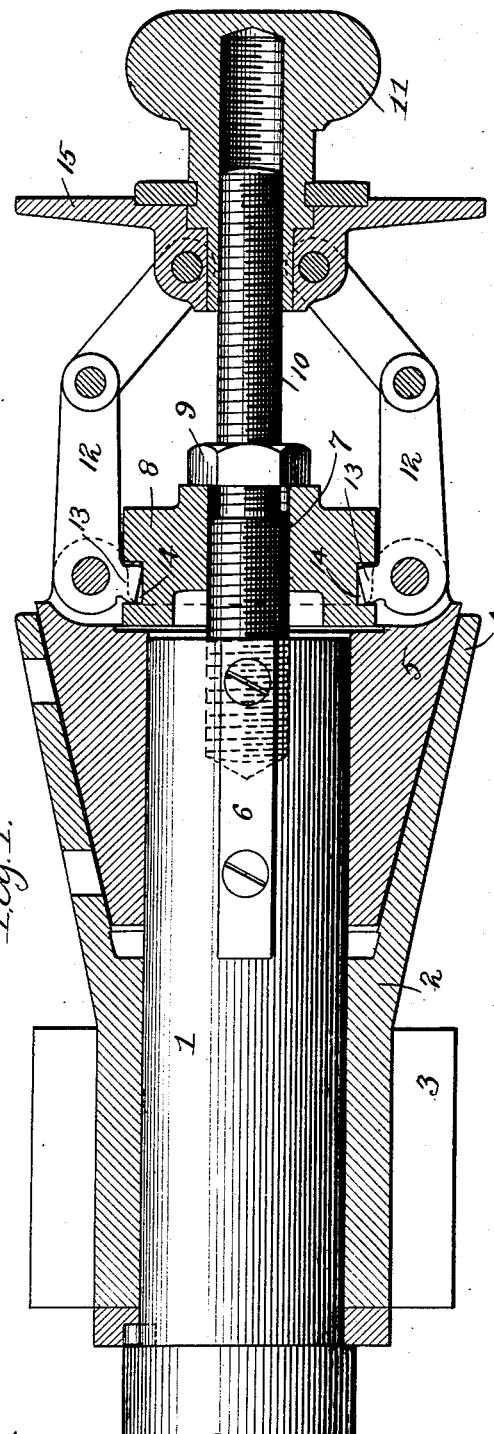
Figure 2:
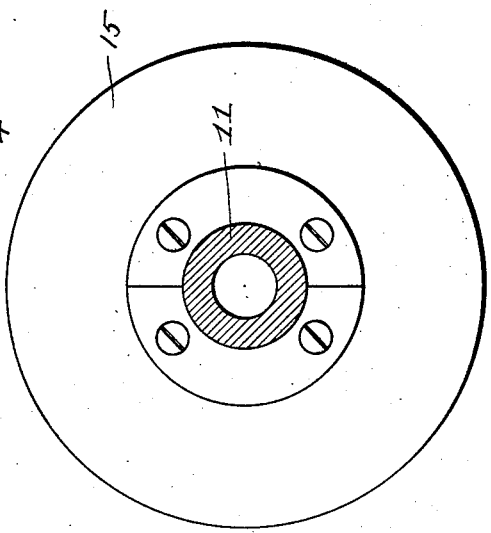

Figure 1 is an elevation, partly in section, showing my improved clutch mechanism; and Fig. 2 is a view showing a detail of the means employed in securing certain of the parts together.

In the practice of my invention I arrange at the end of a driving-shaft 1 a driven or loose pulley 2, rotatably mounted upon the driving-shaft, carrying a gear or other suitable transmitting device 3 and provided with a conical friction portion 4. Within the conical part 4 I arrange a friction part or sleeve 5, designed to rotate with the shaft 1, but capable of longitudinal movement with relation thereto by virtue of a key or feather 6, which operates within a slot in the part 5. Upon the extreme outer end of the driving-shaft I arrange a threaded extension or spindle 7, provided with two threads which are preferably of different diameter and pitch. Engaging the larger of these threads is a collar or block 8, held firmly in its proper position by means of a locking-nut 9, secured upon the smaller of the threads 10, the part 8 and the threaded extension or spindle being in this manner caused to rotate with the driving-shaft 1. Upon the outer end of the spindle 7 is a hand-wheel or nut 11, provided with a screw-threaded opening upon its inner side designed to engage the thread 10. In order to secure the proper longitudinal movement of the friction-sleeve 5, I connect the sleeve 5 with the hand-wheel 11 by a system of levers 12, these levers being provided with bell-crank extensions 13, which are fulcrumed in a circumferential groove 14, formed in the periphery of the block 8, the levers being pivotally attached at their angles to the sleeve. As a protection to the hand of the operator I arrange between the wheel 11 and the levers 12 a guard-flange 15. The outer ends of the levers are connected to a collar, which in turn is rotatably mounted around the inner end of the hand-wheel 11, the two being secured against endwise movement relative to each other by any suitable means, the means shown being a split or divided washer which engages a peripheral groove in the cylindrical portion of the body of the hand-wheel. The angles of the levers are pivotally attached to the sleeve 5 in the manner shown in Fig. 1.

The operation of my device is as follows: The driving-shaft 1 when in rotation carries with it not only the friction-sleeve 5, but also the connected system of levers and the hand-wheel 11, the parts being substantially in the position shown in the drawings. To throw the clutch into operation, it is only necessary to take hold of the wheel 11 and grasp it so as to prevent its rotation with the spindle 7 and the levers 12, when it will immediately move up or inward upon the thread 10, forcing the friction-sleeve 5 against the inner conical surface of the driven sleeve or pulley 2 and causing the latter to rotate.

This clutch is designed particularly for use in connection with gas-engines. In the operation of this type of machine it is desirable that, if possible, the engine may be started before any load is put upon it and the resistance afterward thrown into gear by means of some clutch device. When the engine has been stopped, the clutch can be loosened by unscrewing the hand-wheel 11, so as to draw the friction-sleeve 5 out of engagement with the part 4.

Having thus described my invention, what I claim as new, and desire to secure by Letters Patent, is—

1. A friction-clutch comprising a driving-shaft; a loose gear or pulley mounted thereon; a sliding friction-sleeve mounted upon the shaft in position to be thrown into and out of engagement with the loose gear; a system of bell-crank levers pivotally attached at their angles to the sleeve; a collar or block fixed relatively as to movement between the shaft and sleeve, said block forming a fulcrum for one arm of each of the levers, and means for operating the levers to move the sleeve.

2. A friction-clutch comprising a driving-shaft; a loose gear or pulley mounted thereon; a sliding friction-sleeve mounted upon the shaft in position to be thrown into and out of engagement with the loose gear; a system of bell-crank levers pivotally attached at their angles to the sleeve; a collar or block fixed relatively as to movement between the shaft and sleeve, said block forming a fulcrum for one arm of each of the levers, means for operating the levers to move the sleeve, and means whereby the position of said fulcrum-block may be adjusted.

3. A friction-clutch comprising a driving-shaft; a loose gear or pulley mounted thereon; a sliding friction-sleeve mounted upon the shaft in position to be thrown into and out of engagement with the loose gear; a system of bell-crank levers pivotally attached at their angles to the sleeve; a collar or block fixed relatively as to movement between the shaft and sleeve, said block forming a fulcrum for one arm of each of the levers, and hand-operated mechanism connected to the other arm of each of said levers for moving the sleeve.

4. A friction-clutch comprising a driving-shaft; a loose gear or pulley mounted thereon; a sliding friction-sleeve mounted upon the shaft in position to be thrown into and out of engagement with the loose gear; a system of bell-crank levers pivotally attached at their angles to the sleeve; a collar or block fixed relatively as to movement between the shaft and sleeve, said block forming a fulcrum for one arm of each of the levers, and means for operating the levers to move the sleeve, said means comprising a threaded extension of said shaft, a hand-wheel or nut working thereon, and connections between the bell-crank levers and said hand-wheel.

5. A friction-clutch comprising a driving-shaft; a loose gear or pulley mounted thereon; a sliding friction-sleeve mounted upon the shaft in position to be thrown into and out of engagement with the loose gear; a system of bell-crank levers pivotally attached at their angles to the sleeve; a collar or block fixed relatively as to movement between the shaft and sleeve, said block forming a fulcrum for one arm of each of the levers; a threaded extension on said shaft; a lock-nut upon said threaded extension for holding said fulcrum-block; a hand-wheel working on the same threaded extension; and connections between the bell-crank levers and said hand-wheel, whereby longitudinal movement of the hand-wheel is transmitted to the sleeve.

6. A friction-clutch comprising a driving-shaft; a loose gear or pulley mounted thereon; a sliding friction-sleeve mounted upon the shaft in position to be thrown into and out of engagement with the loose gear; a system of bell-crank levers pivotally attached at their angles to the sleeve; a collar or block fixed relatively as to movement between the shaft and sleeve, said block forming a fulcrum for one arm of each of the levers, hand-operated mechanism connected to the other arm of each of said levers for moving the sleeve, and a guard-flange between the levers and said hand-operated mechanism.

7. A friction-clutch comprising a driving-shaft; a loose gear or pulley mounted thereon; a sliding friction-sleeve mounted upon the shaft in position to be thrown into and out of engagement with the loose gear; a system of bell-crank levers pivotally attached at their angles to the sleeve; a collar or block fixed on said shaft and provided with a peripheral channel forming a fulcrum for one arm of each of the levers; and means for operating the levers to move the sleeve; said fulcrum-block, levers and sleeve all mounted to rotate with the driving-shaft.

8. In a friction-clutch, in combination, a shaft; a wheel normally loose upon the shaft; a sliding friction-sleeve rotating with the shaft and adapted to engage the wheel to rotate it; a collar or block having threaded engagement with the shaft and provided with a peripheral channel; a system of bell-crank levers fulcrumed in said channel and engaging the sleeve to slide it; and means for actuating the levers.

9. A friction-clutch comprising a driving-shaft; a loose gear or pulley mounted thereon; a sliding friction-sleeve mounted upon the shaft in position to be thrown into and out of engagement with the loose gear; a system of bell-crank levers pivotally attached at their angles to the sleeve; a collar or block having threaded engagement with said shaft and forming a fulcrum for one arm of each of the levers; means for operating the levers to move the sleeve; said fulcrum-block, levers and sleeve all mounted to rotate with the driving-shaft; and means for moving said levers.

FRANK G. HOBART.

Witnesses:
 B. P. ELDRED,
 F. L. BUSH.